United States Patent
Vissametty et al.

(10) Patent No.: US 10,599,842 B2
(45) Date of Patent: Mar. 24, 2020

(54) DECEIVING ATTACKERS IN ENDPOINT SYSTEMS

(71) Applicant: Attivo Networks Inc., Fremont, CA (US)

(72) Inventors: Venu Vissametty, San Jose, CA (US); Muthukumar Lakshmanan, Bangalore (IN); Harinath Vishwanath Ramchetty, Bengaluru (IN); Vinod Kumar A. Porwal, Bangalore (IN)

(73) Assignee: ATTIVO NETWORKS INC., Fremont, CA (US)

( * ) Notice: Subject to any disclaimer, the term of this patent is extended or adjusted under 35 U.S.C. 154(b) by 243 days.

(21) Appl. No.: 15/383,522

(22) Filed: Dec. 19, 2016

(65) Prior Publication Data

US 2018/0173876 A1    Jun. 21, 2018

(51) Int. Cl.
*G06F 21/55* (2013.01)
*G06F 21/62* (2013.01)

(52) U.S. Cl.
CPC ........ *G06F 21/556* (2013.01); *G06F 21/6218* (2013.01); *G06F 2221/034* (2013.01)

(58) Field of Classification Search
CPC ............... G06F 21/556; G06F 21/6218; G06F 2221/034
See application file for complete search history.

(56) References Cited

U.S. PATENT DOCUMENTS

| | | | | |
|---|---|---|---|---|
| 8,181,033 B1* | 5/2012 | Paul | ........................ | G06F 21/00 713/187 |
| 2004/0083369 A1* | 4/2004 | Erlingsson | ........... | G06Q 20/401 713/176 |
| 2005/0223239 A1* | 10/2005 | Dotan | ..................... | G06F 21/52 713/188 |
| 2009/0158407 A1* | 6/2009 | Nicodemus | ............. | H04L 63/20 726/6 |
| 2013/0052992 A1* | 2/2013 | Lee | ......................... | G06F 21/52 455/411 |
| 2013/0061097 A1* | 3/2013 | Mendel | .................... | G06F 21/54 714/47.1 |
| 2013/0191924 A1* | 7/2013 | Tedesco | .................. | G06F 21/00 726/26 |
| 2013/0290729 A1* | 10/2013 | Pettigrew | ................ | G06F 21/52 713/187 |
| 2013/0340033 A1* | 12/2013 | Jones | ..................... | H04W 12/08 726/1 |
| 2014/0068779 A1* | 3/2014 | Tan | ....................... | G06F 21/606 726/26 |

(Continued)

*Primary Examiner* — Cheng-Feng Huang
(74) *Attorney, Agent, or Firm* — David R. Stevens; Stevens Law Group

(57) ABSTRACT

Endpoints in a network execute a sensor module that intercepts commands. The sensor module compares a source of commands to a sanctioned list of applications received from a management server. If the source does not match a sanctioned application and the command is a write or delete command, the command is ignored and a simulated acknowledgment is sent. If the command is a read command, deception data is returned instead. In some embodiments, certain data is protected such that commands will be ignored or modified to refer to deception data where the source is not a sanctioned application. The source may be verified to be a sanctioned application by evaluating a certificate, hash, or path of the source.

10 Claims, 5 Drawing Sheets

(56) References Cited

U.S. PATENT DOCUMENTS

| | | | |
|---|---|---|---|
| 2014/0215625 A1* | 7/2014 | Paul | G06F 21/00 |
| | | | 726/23 |
| 2014/0282816 A1* | 9/2014 | Xie | H04L 63/0227 |
| | | | 726/1 |
| 2014/0349611 A1* | 11/2014 | Kant | H04W 8/18 |
| | | | 455/411 |
| 2015/0096048 A1* | 4/2015 | Zhang | G06F 21/6218 |
| | | | 726/27 |
| 2016/0080414 A1* | 3/2016 | Kolton | H04L 63/1491 |
| | | | 726/23 |
| 2017/0134405 A1* | 5/2017 | Ahmadzadeh | H04L 63/1416 |
| 2017/0147796 A1* | 5/2017 | Sardesai | G06F 21/10 |
| 2017/0149832 A1* | 5/2017 | Touboul | G06F 21/577 |
| 2017/0235967 A1* | 8/2017 | Ray | G06F 21/6218 |
| | | | 713/165 |
| 2017/0302458 A1* | 10/2017 | Berger | G06F 21/6218 |
| 2017/0302653 A1* | 10/2017 | Ortner | G06F 21/6218 |
| 2017/0302696 A1* | 10/2017 | Schutz | H04L 63/1441 |
| 2017/0331849 A1* | 11/2017 | Yu | H04L 63/1433 |
| 2017/0346802 A1* | 11/2017 | Gruskin | H04L 63/08 |
| 2017/0359370 A1* | 12/2017 | Humphries | H04L 63/1441 |
| 2018/0027006 A1* | 1/2018 | Zimmermann | H04L 63/0245 |
| | | | 726/11 |
| 2018/0143915 A1* | 5/2018 | Gonzalez | G06F 21/51 |

* cited by examiner

DECEIVING ATTACKERS IN ENDPOINT SYSTEMS

BACKGROUND

Once an end point system is compromised, attackers try to move laterally in the network. Attackers harvest data from end point systems and then use that information to move laterally. The systems and methods disclosed herein provide an improved approach for preventing unauthorized access to application data on endpoint systems.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
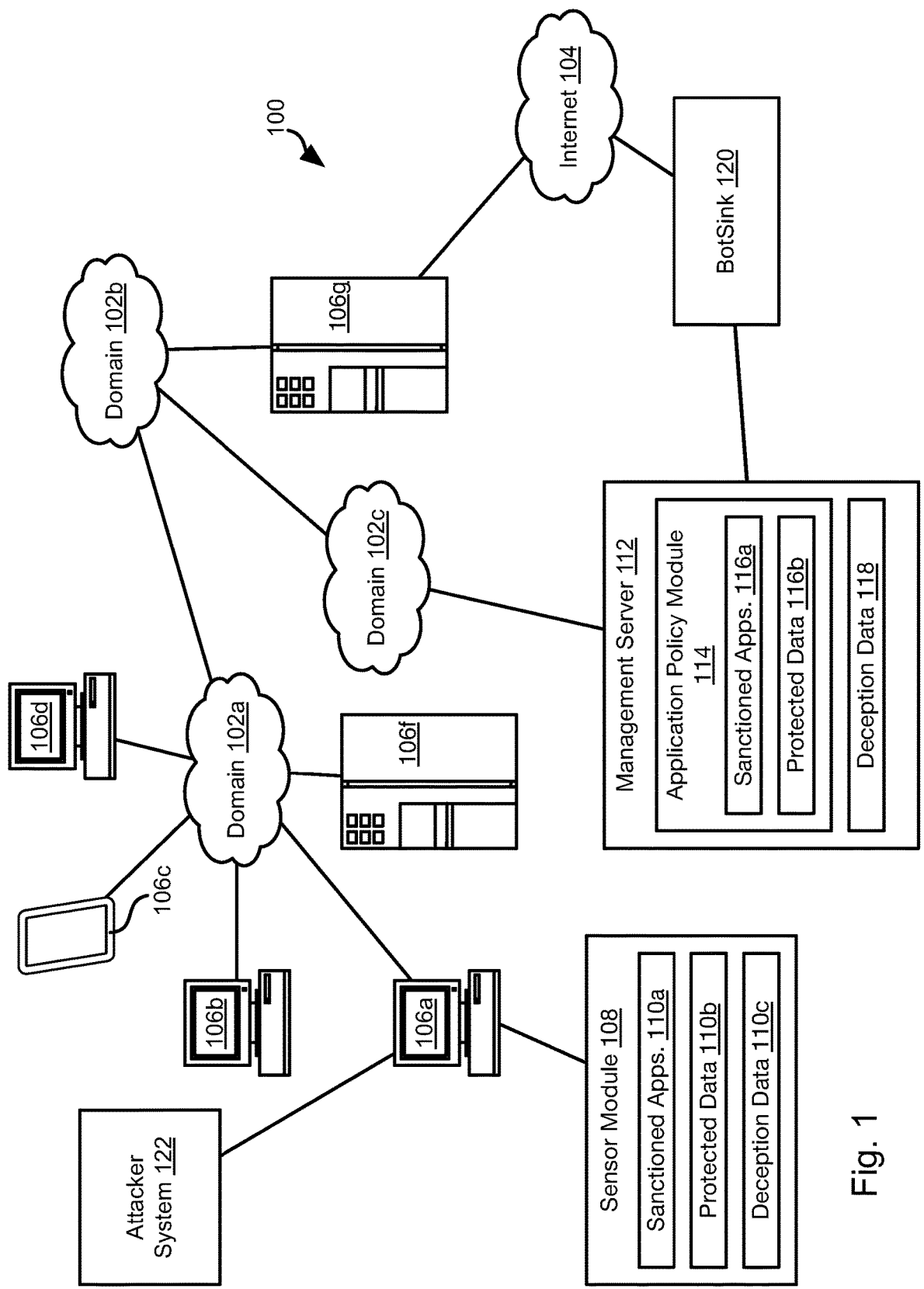
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the methods disclosed herein may be practiced in a network environment 100 including a plurality of domains 102*a*-102*c*. The domains 102*a*-102*c* may be any network division, such as a subnet, local area network (LAN), virtual local area network (VLAN), or the like. The domains 102*a*-102*c* may be distributed within a same building or over a large geographic area with interconnecting links including the Internet 104. The illustrated domains 102*a*-102*c* may represent one or more network components, such as routers, switches, servers, and the like that implement routing of traffic within the domains 102a-102c and control traffic flowing into and out of the domains 102a-102c Each domain may include one or more endpoints 106a-106g. The endpoints 106a-106g are production computing devices that operate as personal computers for users or servers providing production services to other endpoints or to external computers accessing the network environment by way of the internet 104. The endpoints 106a-106g may be desktop or laptop computers, mobile phones, tablet computers, server computers, and any other type of computing device. Some endpoints 106a-106g may include internet-enabled devices, i.e. so-called internet of things (IoT) devices that are often a vulnerability.

The endpoints 106a-106g are not dedicated honeypots, but rather perform non-decoy functions and process legitimate production data and legitimate production tasks of an enterprise, such as functioning as user computers executing applications such as word processors, browsers, graphics programs etc. The endpoints 106a-106g may also function as web servers, database servers, remote login servers, application servers, and the like.

Some or all of the endpoints 106a-106g execute a sensor module 108. The sensor module 108 stores or accesses a list of sanctioned applications 110a and may also store or access a listing or description of protected data 110b. The endpoints 106a-106g may execute one or more instances of one or more of the sanctioned applications 110a and store data generated or used by these applications that corresponds to the protected data. The sanctioned applications 110a are production applications for performing any of the production tasks and functionality mentioned above. Accordingly, the protected data 110b may also be production data for use in performing the production tasks and functionality mentioned above, as opposed to decoy or deceptive data.

The sensor module 108 may store or access deception data 110c stored locally on the endpoint 106a-106g or accessed from another location. The deception data 110c may mimic the format of production data in the form of web pages, word processor documents, spreadsheets, databases, etc. The deception data 110c may also mimic other files used by applications such as credentials for authenticating the application with a remote server, configuration files, browser histories, a listing of recently accessed files, configuration files, and the like.

In the case of credentials or other files that are used to access a remote server or provide a record of accessing a remote server, the deception data 110c may reference a BOTSINK 120. The BOTSINK 120 may function as a honey pot programmed to engage an attacker while preventing access to production data or computer systems. For example, the BOTSINK 120 may execute one or more virtual machines implementing network services that engage and monitor malicious code while preventing access to other endpoints 106a-106g of the network. The BOTSINK 120 may implement any of the method methods for detecting and engaging malicious code disclosed in the following applications (herein after "the incorporated applications"), which are hereby incorporated herein by reference in their entirety:

U.S. application Ser. No. 14/458,026, filed Aug. 12, 2014, and entitled DISTRIBUTED SYSTEM FOR BOT DETECTION;

U.S. application Ser. No. 14/466,646, filed Aug. 22, 2014, and entitled EVALUATING URLS FOR MALICIOUS CONTENT;

U.S. application Ser. No. 14/549,112, filed Nov. 20, 2014, and entitled METHOD FOR DIRECTING MALICIOUS ACTIVITY TO A MONITORING SYSTEM;

U.S. application Ser. No. 15/157,082, filed May 17, 2016, and entitled EMULATING SUCCESSFUL SHELLCODE ATTACKS;

U.S. application Ser. No. 14/805,202, filed Jul. 21, 2015, and entitled MONITORING ACCESS OF NETWORK DARKSPACE;

U.S. application Ser. No. 14/965,574, filed Dec. 10, 2015, and entitled DATABASE DECEPTION IN DIRECTORY SERVICES;

U.S. application Ser. No. 15/142,860, filed Apr. 29, 2016, and entitled AUTHENTICATION INCIDENT DETECTION AND MANAGEMENT;

U.S. application Ser. No. 15/153,471, filed May 12, 2016, and entitled LURING ATTACKERS TOWARDS DECEPTION SERVERS;

U.S. application Ser. No. 15/204,779, filed Jul. 7, 2016, and entitled DETECTING MAN-IN-THE-MIDDLE ATTACKS; and U.S. application Ser. No. 15/360,117, filed Nov. 23, 2016, and entitled IMPLEMENTING DECOYS IN NETWORK ENDPOINTS.

In some embodiments, the data 110a-110c is provided to the endpoints 106a-106g by a management server 112. The management server 112 may implement an application policy module 114. The application policy module 114 stores or accesses a listing 116a of sanctioned applications and may provide an interface for an administrator to specific what applications are included in the listing 116a. The listing 116a may indicate which applications are sanctioned for particular endpoints 106a-106g or for endpoints in a particular domain 102a-102c. The listing 116a may be automatically updated to include applications as they are installed on endpoints 106a-106g by an administrator.

In a similar manner, the management server 112 may store or access protected data 116b that lists data files, folders, or other descriptors of data that are protected. The protected data 116b may be obtained automatically from configuration files for applications. For example, an application on installation will often create directories for files used by the application. Accordingly, these directories and files may be observed by analyzing the configuration files for instructions to create these directories and files or by observing how the file system changes following installation of the application on a sample endpoint.

The management server 112 may also store or access deception data 118. As noted above, this deception data may mimic production data for one or more applications and may reference the BOTSINK 120 in order to lure attackers into engagement with the BOTSINK 120.

The management server 112 distributes some or all of the data 116a-116b, 118 to the endpoints 106a-106g. For example, deception data 118 provided to an endpoint may mimic files generated or used by one or more production applications actually installed on that endpoint. Likewise, the listing of sanctioned applications 116a provide to the endpoint may include only those applications that were installed by an administrator or authorized user on that endpoint. The deception data 118 provided to the endpoint may then include deception data mimicking the production data of those applications. The management server 112 may periodically update the data 116a-116b, 118 and distribute updated data to the endpoints 106a-106g.

The methods disclosed herein are invoked in response to an attacker system 122 attempting to access production application data on an endpoint 106a-106g. This may include the attacker system 122 issuing commands to the endpoint 106a-106g or uploading malicious code to the endpoint 106a-106g, which then attempts to access the production application data. However, unauthorized access may be prevented using the methods disclosed herein in either case.

Figure 2:
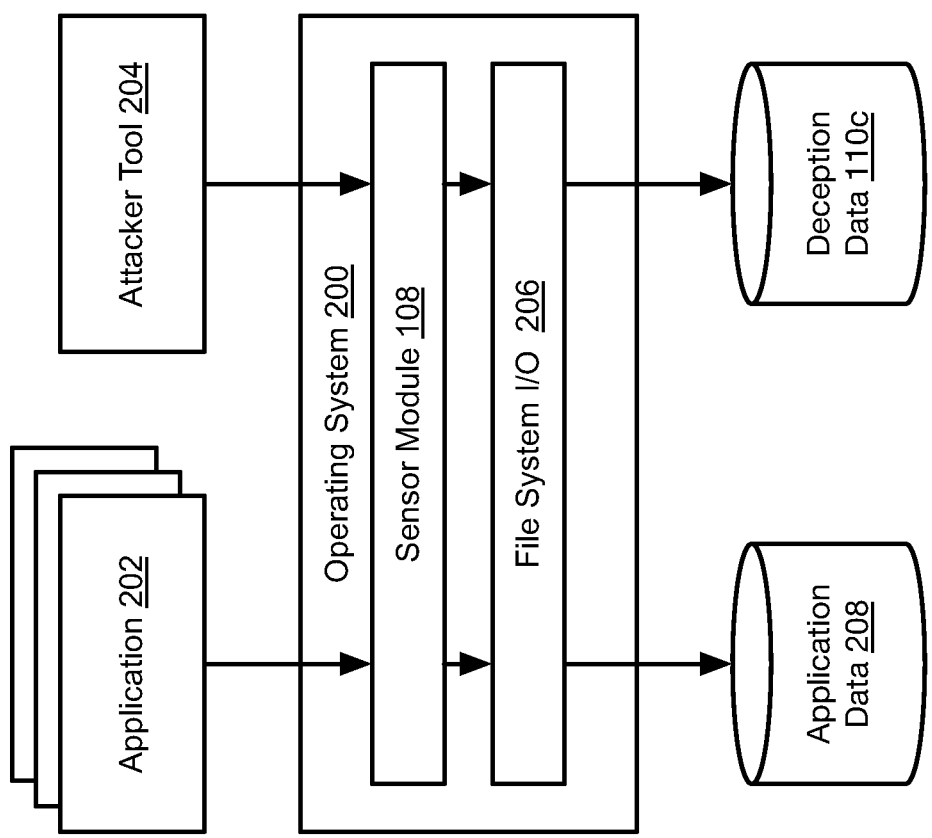
FIG. 2 is a diagram illustrating components for preventing unauthorized access to application data in accordance with an embodiment of the present invention.

Referring to FIG. 2, the sensor module 108 may be incorporated into the operating system 200, such as by modifying the functions of one or more libraries for performing access to a file system. The sensor module 108 intercepts file system command from instances of applications 202 installed on the endpoint as well as file system commands from an attacker, such as an attacker tool 204 executing on the endpoint. The file system commands that are intercepted may include write commands, read commands, delete comments, or instructions to list the contents of a directory or other commands to navigate through a directory.

The sensor module 108 evaluates a source of each command, e.g. the binary instance executing on the endpoint that issued the command to the operating system. If the source of the command is an application listed in the sanctioned applications 110a, the command is passed to the file system I/O (input output) functions 206 of the operating system 200, which then executes the command with respect to the production application data 208.

If the source of the command is not found to be in the sanctioned applications 110a, the command may be modified such that it refers to deception data 110c. The modified command may then be input to the file system I/O functions 206. In the case of a write or delete command, the sensor module 108 may suppress execution of the command and return an acknowledgment to the source of the command indicating that the command was executed successfully.

In the embodiment of FIG. 2, the modified commands are executed by the same file system I/O functions 206 as other commands. Accordingly, the deception data 110c may be stored in the file system and accessible to such functions 206. However, the deception data 110c may be hidden such that it is not viewable by users or applications executing on the endpoint.

In other embodiments, the sensor module 108 itself may access and return the deception data 110c, in which case the deception data 110c may be stored anywhere, including remotely from the endpoint and referenced by the sensor module 108. The deception data 110c could, for example, be encrypted such that only the sensor module 108 can decrypt the deception data 110c in order to return it in response to a read command from the attacker tool 204 or other unauthorized source.

In still other embodiments, the sensor module 108 may automatically generate deception data 110c in response to file system commands, such as based on templates that are populated with random data in order to mimic a type of file requested by the file system command from the attacker tool 204.

Figure 3A:
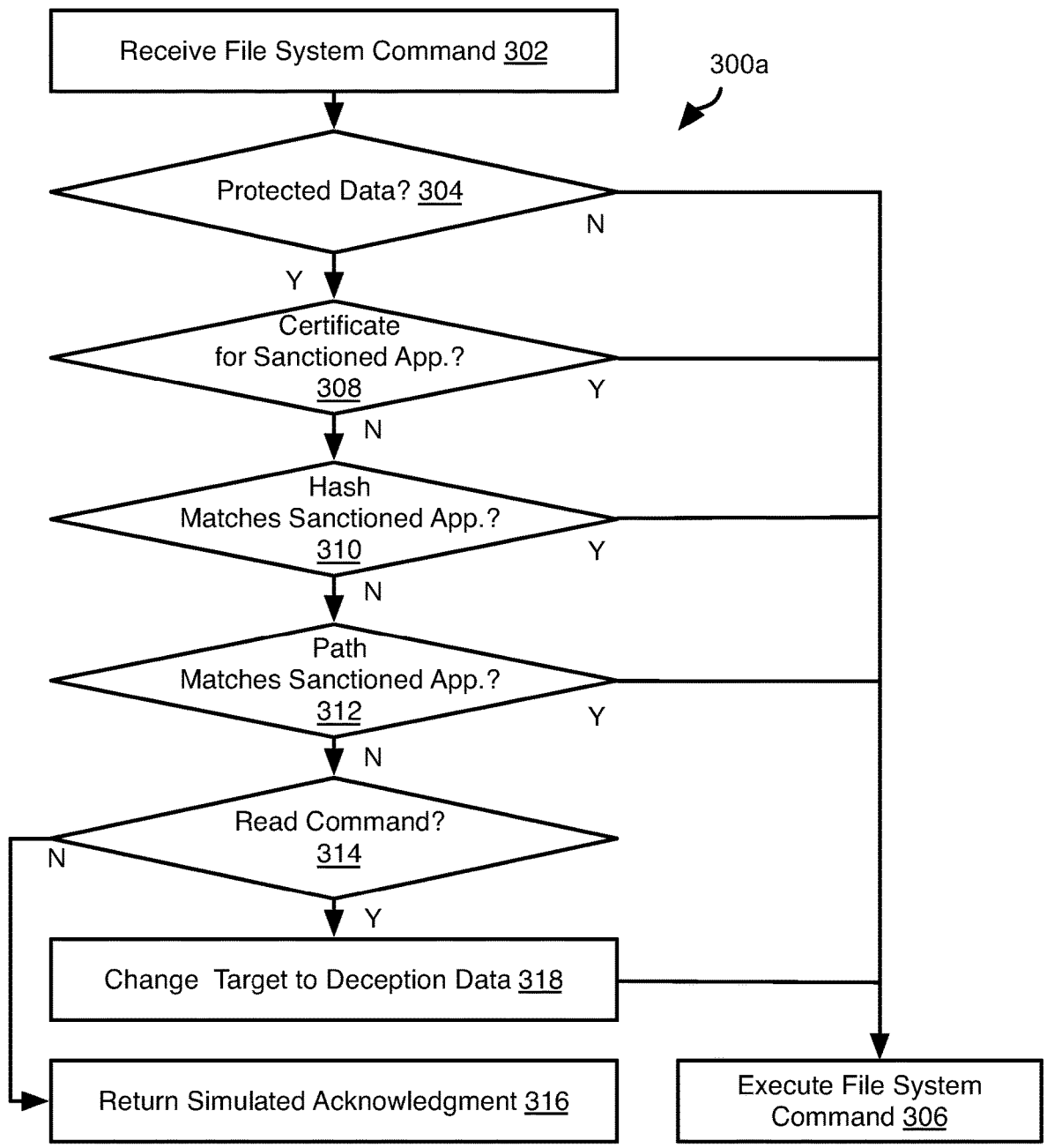
FIGS. 3A and 3B are process flow diagrams of methods for preventing unauthorized access in accordance with an embodiment of the present invention.

Referring to FIG. 3A, the sensor module 108 may include any executable code programmed to execute the illustrated method 300a. The method 300a may include receiving 302 a file system command, such as by intercepting a command made to the operating system 200 of the endpoint in which the sensor module 108 is embedded.

The method 300a may include evaluating 304 whether the data (file, directory, type of file, etc.) is protected data, such as might be indicated by the listing 110b of protected data on the endpoint. If not, the method 300a may include executing 306 the file system command without modification, i.e. passing it to the operating system 200 for execution. In some embodiments, only the sanctioned applications 110a are permitted to issue file system commands, which may include operating system utilities. Accordingly, in some embodiments, step 304 may be omitted.

The method 300a may further include evaluating a source of the file system command according to some or all of steps 308-312. For example, if the source of the file system command is found 308 to have a certificate matching that of a sanctioned application 110a, then file system command may be executed 306 with respect to the data referenced in the command.

If a hash, e.g. the SHA-1 (secure hash algorithm) hash of the binary code that issued the file system command is found 310 to match a hash of the binary executable for one of the sanctioned applications 110a, then the file system command may be executed 306 with respect to the data referenced in the command.

If a path to the binary code that issued the file system command is found 312 to match the path to the binary executable of one of the sanctioned applications 110a, then the file system command may be executed 306 with respect to the data referenced in the command.

Steps 308-312 are just examples of checks that may be used to verify whether binary code issuing a command is in fact an instance of a sanctioned application. In some embodiments, all of steps 308-312 must be satisfied before step 306 will be executed with respect to the data referenced in the command. In other embodiments, other checks may be used as alternatives or as additional requirements before step 306 will be executed with respect to the data referenced in the command.

In some embodiments, certain protected data may be bound to a particular sanctioned application 110a. Accordingly steps 308-312 may be evaluated only for those applications that are bound to the protected data 110b referenced in the file system command, i.e. the command will be executed with respect to the data referenced in the command only if one of 308-312 (or each and every one of 308-312 in some embodiments) is satisfied for at least one sanctioned application 110a that is also bound to the protected data 110b referenced in the file system command.

If the tests of steps 308-312 are not sufficient to invoke execution of step 306 for the data referenced in the file system command according to any of the embodiments mentioned above, then the source of the file system command may be determined not to be one of the sanctioned applications 110a and processing continues at steps 314, 318.

If the file system command is found 314 to be a read comment, then file system command may be changed 318 to refer to the deception data 110c of the endpoint. Step 306 may be executed with respect to the modified file system command, which will include returning the deception data referenced by the modified file to the source of the file system command, such as to the attacker tool 204.

If the file system command is found 316 not to be a read command, such as in the case of a write or a delete command, then the file system command is ignored and a simulated acknowledgment of the command is returned 316 to the source of the file system command.

Figure 3B:
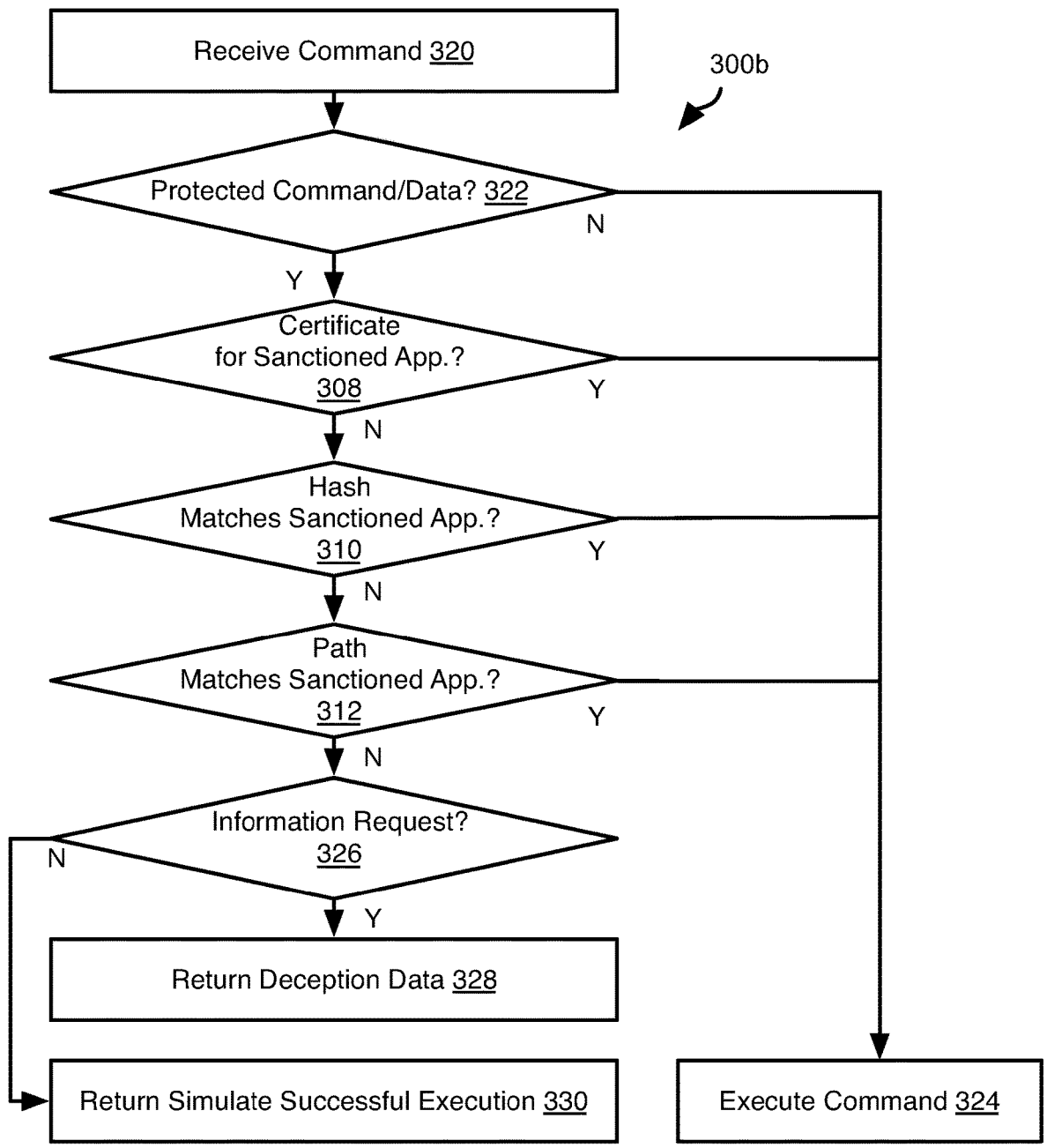

Referring to FIG. 3B, in some embodiments, the sensor module 108, or a different sensor module 108 may execute the illustrated method 300b with respect to commands other than file system commands. In some embodiments, a plurality of sensor modules 108 execute on the endpoint and each sensor module 108 may intercept a different types of command. Each sensor module will then execute the method 300a or 300b upon intercepting that type of command. For example, requests to modify, delete, or read information regarding processes executing on the endpoint, the registry of the endpoint, or an application programming interface (API) available to applications executing on the endpoint. The method 300b may include receiving 320 a command and evaluating 322 whether the command references protected data or is a protected command. If not, then the command may be executed 324. For example, the protected data 110b may indicate which commands are restricted to sanctioned applications 110a in addition to data or types of data that are protected. In some embodiments, only sanctioned applications are permitted to access any data or invoke execution of any command. Accordingly, step 322 may be omitted as a path to execution 324 of a command.

The method 300b may further include evaluating the source of the command of step 320 according to steps 308-312 in the same manner as for the method 300a. If the conditions of steps 308-312 are met, then the command may be executed in the same form it was received. As for the method 300a, all of steps 308-312 must have a positive result before the command is executed 324 and one or more additional tests may be required to be satisfied before the command is executed 324 without modification.

If the steps 308-312 indicate that the source is a sanctioned application, then the method 300b may include evaluating 326 whether the command is a request for information, such as a request for information regarding executing processes, the registry, available APIs, or other system information. If so, then deception data is returned 328 to the source of the command. As for other embodiments disclosed herein, the deception data that is returned may mimic the legitimate data that is requested but not correspond to actual system data.

If the command is not a request for information, the method 300b may include returning 330 a result that simulates successful execution of the command. As for the method 300a, a delete command may indicate that data was successfully deleted, a modify command may indicate that the system data or process or operating parameter referenced in the command was modified as requested.

An example of the use of the method 300a may include the browser history for a browser. For example, the FIREFOX browser history may be stored at C:\Users\<user name>\AppData\Roaming\Mozilla\Firefox\Profiles\<some profile number>.default\formhistory.sqlite. Ordinarily, only the FIREFOX browser should access this file inasmuch as it will include functions for displaying the browser history on request. Accordingly, any other application attempting to access this file or its directory may be blocked by the sensor module 108 and instead receive a simulated browser history file including decoy data.

In another example, in WINDOWS, the "shawdowcopy delete" command deletes the volume shadow copies. Malware often deletes this to accessing of backup volumes. Accordingly, this file may be listed as protected data 110b and sensor module 108 will detect attempts to delete the volume shadow copies by non-sanctioned applications and prevent their execution. As noted above, acknowledgments of such commands may be returned indicating that the volume shadow copies were in fact deleted.

In an example of the use of the method 30b, an attacker, e.g. attacker tool 122, tries to access the registry, which may be in a listing of protected data 110b. For example, the attacker may attempt to read the registry to determine a registry key for one or more antivirus application (e.g., MCAFEE, SYMANTEC, or the like) is present in the registry. No legitimate application would generally need to access the registry to determine whether an antivirus application is installed. In some embodiments, the sensor module 108 may intercept such attempts and return a result including a registry key for the antivirus tool, regardless of whether the antivirus application is installed. In many cases, this will cause the attacker tool to refrain from installing itself or otherwise attempting to perform malicious activities.

In another example, the attacker, e.g. attacker tool 122, seeks to determine whether the endpoint is a virtual machine (VM), such as by evaluating the registry to determine whether a hypervisor is installed and/or executing on the endpoint. The sensor module 108 intercepts these requests and returns an output indicating that the endpoint is executing a VM, e.g. indicate that the current operating environment in which the command was received is a VM or that a hypervisor is installed and/or executing on the endpoint. In another example, the attacker, e.g. attacker tool 122, seeks to view a list of processes executing on the endpoint. In response, the sensor module 108 will return a "correct list of processes list" to the attacker.

Figure 4:
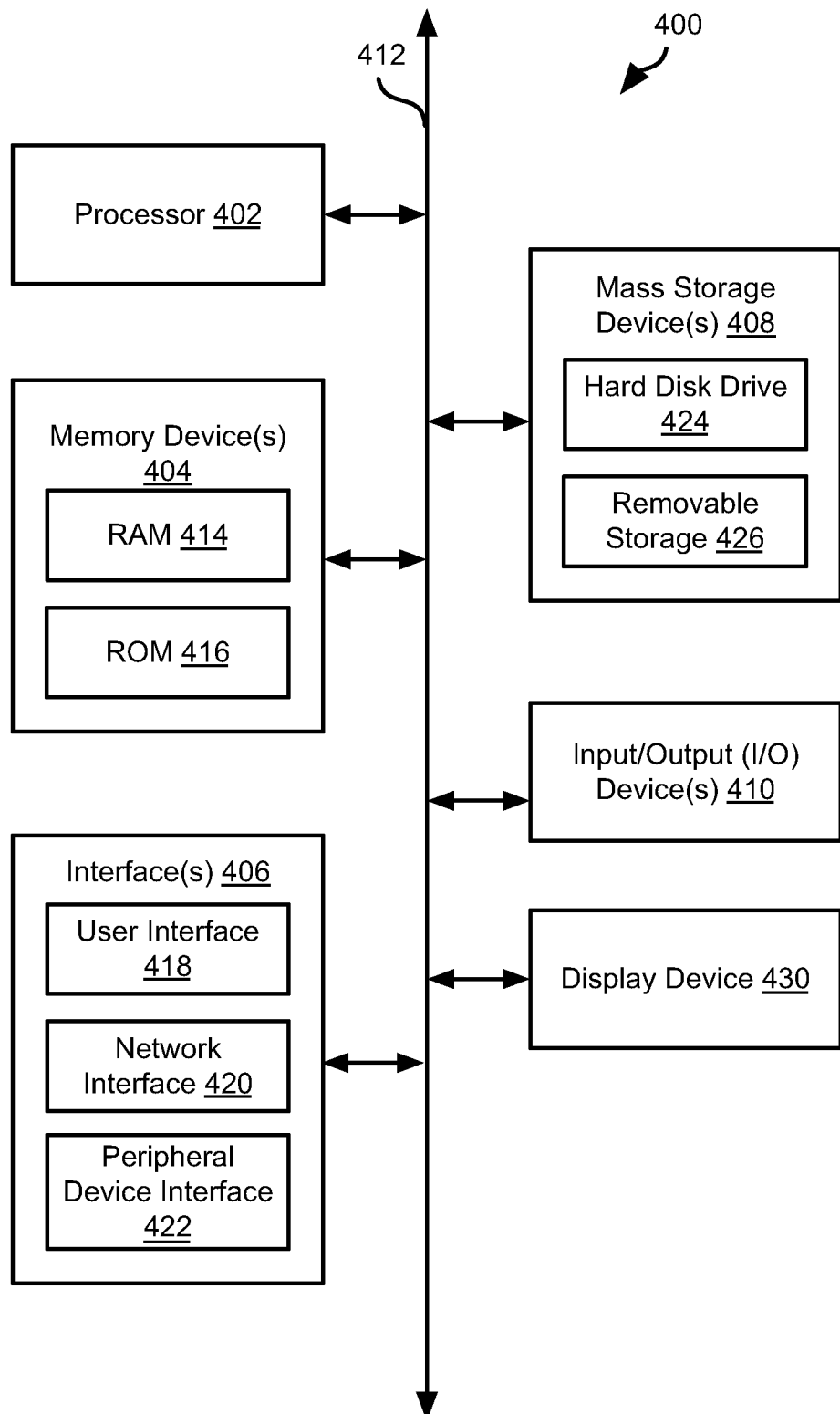
FIG. 4 is a schematic block diagram of a computer system suitable for implementing methods in accordance with embodiments of the present invention.

FIG. 4 is a block diagram illustrating an example computing device 400 which can be used to implement the system and methods disclosed herein. The endpoints 106a-106g, management server 112, BOTSINK 120, and attacker system 122 may also have some or all of the attributes of the computing device 400. In some embodiments, a cluster of computing devices interconnected by a network may be used to implement any one or more components of the invention.

Computing device 400 may be used to perform various procedures, such as those discussed herein. Computing device 400 can function as a server, a client, or any other computing entity. Computing device can perform various monitoring functions as discussed herein, and can execute one or more application programs, such as the application programs described herein. Computing device 400 can be any of a wide variety of computing devices, such as a desktop computer, a notebook computer, a server computer, a handheld computer, tablet computer and the like.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 include various computer readable media, such as magnetic tapes, magnetic disks, optical disks, solid-state memory (e.g., Flash memory), and so forth. As shown in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 430 includes any type of device capable of displaying information to one or more users of computing device 400. Examples of display device 430 include a monitor, display terminal, video projection device, and the like.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet. Other interface(s) include user interface 418 and peripheral device interface 422. The interface(s) 406 may also include one or more user interface elements 418. The interface(s) 406 may also include one or more peripheral interfaces such as interfaces for printers, pointing devices (mice, track pad, etc.), keyboards, and the like.

Bus 412 allows processor(s) 402, memory device(s) 404, interface(s) 406, mass storage device(s) 408, and I/O device (s) 410 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400, and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method comprising:
   providing on a computer system a listing of sanctioned applications;
   receiving, by the computer system, a command referencing subject data from a source;
   (a) determining, by the computer system, that the command was not received from one of the sanctioned applications by determining that a certificate of the source does not match a certificate of one of the sanctioned applications, a hash of binary code for the source does not match a hash of one of the sanctioned applications, and that a path to the binary code for the source does not match a path of one of the sanctioned applications; and
   (b) in response to (a) refraining from executing the command with respect to the subject data;
   (c) determining, by the computer system, that the command is a request for the subject data;
   in response to (c), passing, by the computer system, the command to an operating system executing on the computer system having a reference to the subject data replaced with a reference to deception data that is different from the subject data, the subject data having a format, the deception data being decoy data having the format, the subject data referencing a production server and the deception data referencing a decoy server that is different from the production server and coupled to the computer system by a network;
   (d) detecting, by the decoy server, an attempt by a module to access the deception server using the deception data;
   in response to (d), engaging and monitoring the module;
   (e) determining that the command is a request to modify the subject data; and
   in response to (e), refraining from executing the request to modify the subject data and returning to a source of the command an indication that the request to modify the subject data was executed successfully.

2. The method of claim 1, further comprising:
   providing on the computer system a listing of protected data;
   (e) determining that the subject data is included in the protected data; and
   performing (a) and (b) in response to (e).

3. The method of claim 1, wherein the command is a first command, the method further comprising:
   receiving a second command referencing the subject data;
   (e) determining that the second command was generated by an application in the list of sanctioned applications; and
   in response to (e), executing the second command with respect to the subject data.

4. A system comprising one or more processing devices and one or more memory devices operably coupled to the one or more processing devices, the one or more memory devices storing executable code to cause the one or more processing devices to:
   store a listing of sanctioned applications;
   execute one or more instances of one or more of the sanctioned applications;
   receive, by an operating system, a command referencing subject data from a source; and
   in response to receiving the command referencing the subject data—
      intercepting, by a sensor, the command;
      (a) if the a certificate of the source does not match a certificate of one of the sanctioned applications, a hash of binary code for the source does not match a hash of one of the sanctioned applications, and that a path to the binary code for the source does not match a path of one of the sanctioned applications, prevent execution of the command by the operating system with respect to the subject data;
   wherein the one or more memory devices further store executable code to cause the one or more processing devices to:
      if the command is a request for the subject data, the subject data being included in protected data, and the command was not received from one of the one or more instances, pass the command to the operating system having a reference to the subject data replaced with a reference to deception data that is different from the subject data but has a format corresponding to the subject data;
      if the command is a request to modify the subject data, the subject data is included in the protected data, and the command was not received from one of the one or more instances, refrain from executing the request to modify the subject data and return to the source an indication that the request to modify the subject data was executed successfully;

wherein the system further comprises an engagement computing device connected to the one or more processing devices by a network, the deception data referencing the engagement computing device, the engagement computing device being programmed to engage modules attempting to access the engagement computing device using the deception data.

5. The system of claim 4, wherein the one or more memory devices further store executable code to cause the one or more processing devices to:
   store a listing of protected data;
   in response to receiving the command referencing the subject data—
      perform (a) only if the subject data is included in the protected data.

6. The system of claim 4, wherein the one or more memory devices further store executable code to cause the one or more processing devices to permit execution of the command by the operating system with respect to the subject data only if at least one of:
   a source of the command has a certificate matching one of the sanctioned applications;
   a hash of binary code for a source of the command matches a hash of one of the sanctioned applications; and
   a path to binary code corresponding a source of the command matches a path to one of the sanctioned applications.

7. The system of claim 4, wherein the subject data is a browsing history file and the deception data is a simulated browser history file.

8. The system of claim 4, wherein the command is a shadowcopy delete command and the subject data is a backup volume.

9. The system of claim 4, wherein:
   the subject data is a registry of the computer system;
   the command is a query to determine whether the registry references an antivirus program; and
   wherein the one or more memory devices further store executable code to cause the one or more processing devices to:
      simulate a response to the command that indicates that the registry references the antivirus program even though the registry does not reference the antivirus program.

10. The system of claim 4, wherein the deception data is a credential that is sufficient to authenticate with respect to the engagement computing device.

* * * * *